Figure 1:
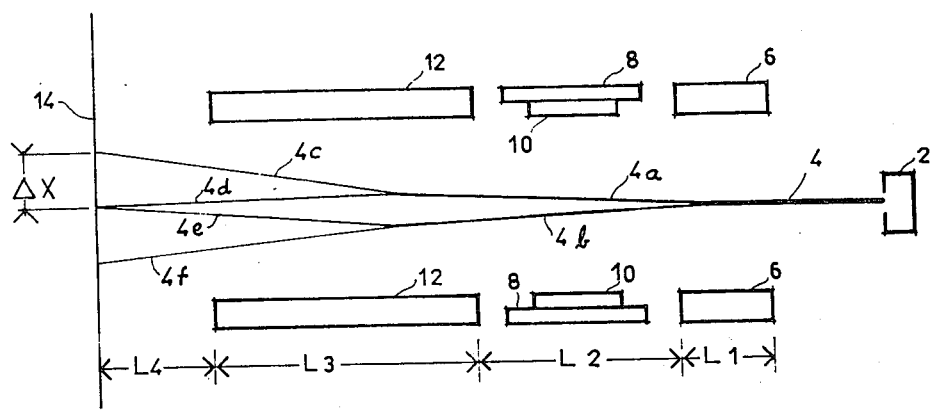

United States Patent [19]

Ami-Rav

[11] 4,199,679
[45] Apr. 22, 1980

[54] METHOD AND APPARATUS FOR THE SEPARATION OF ISOTOPES

[76] Inventor: Aviv Ami-Rav, 6 Zahal Str., Givatayim, Israel

[21] Appl. No.: 743,757

[22] Filed: Nov. 22, 1976

[30] Foreign Application Priority Data

Nov. 27, 1975 [IL] Israel .................................. 48553

[51] Int. Cl.$^2$ .................... G01N 27/78; H01S 9/00
[52] U.S. Cl. ............................................. 250/251
[58] Field of Search ............... 250/251, 281, 282, 290, 250/423 P, 284; 204/DIG. 11, 162 R, 157.1 H, 158 HE; 55/17; 423/250

[56] References Cited

U.S. PATENT DOCUMENTS

| | | | |
|---|---|---|---|
| 3,484,603 | 12/1969 | Bloom et al. | 250/251 |
| 3,578,968 | 8/1972 | Hellwig | 250/251 |
| 3,676,171 | 6/1972 | Lacey et al. | 250/251 |
| 3,749,909 | 7/1973 | Hill | 250/251 |
| 3,824,394 | 7/1974 | Kartaschoff | 250/251 |
| 3,937,956 | 2/1976 | Lyon | 250/283 |
| 3,967,115 | 6/1976 | Kern | 250/251 |
| 4,020,350 | 4/1977 | Ducas | 250/423 P |
| 4,025,787 | 5/1977 | Janner et al. | 250/251 |
| 4,031,389 | 6/1977 | Russel et al. | 250/283 |
| 4,031,397 | 6/1977 | Cardillo | 250/423 P |

FOREIGN PATENT DOCUMENTS

2312194  10/1973  Fed. Rep. of Germany ........... 250/284

Primary Examiner—Samuel W. Engle
Assistant Examiner—S. A. Cangialosi
Attorney, Agent, or Firm—J. Harold Nissen

[57] ABSTRACT

A method and an apparatus for the separation of isotopes from an atomic or molecular paramagnetic or polar beam of isotopic mixtures, by the utilization of the isotopic differences of said atoms as well as molecules, in the Electron Spin Resonance (E.S.R.) spectra and in other magnetic or electric resonances such as in the Nuclear Magnetic Resonance (N.M.R.) or Stark Resonance, is disclosed. The apparatus comprises means for producing a paramagnetic or polar particle beam of an isotopic mixture; means for changing the distribution of the $m_j$ values in said particle beam to at least one beam having a discrete $m_j$ value or values, where $m_j$ is the projection of the angular momentum of a particle in the direction of the applied magnetic field or the projection of the rotational angular momentum of the polar molecular in the direction of the applied electric field; means for producing a homogeneous magnetic or electric field along a section of the path of said particle beam; a transmitter for transmitting signals in at least one of the E.S.R., and/or N.M.R. and/or a Stark resonance frequency or frequencies of at least one of the isotopes in said particle beam passing through said homogeneous magnetic or electric field; and means for producing an inhomogeneous magnetic or electric field gradient for separating said isotopes by splitting, focusing and/or diverting beams of identical isotopes.

26 Claims, 2 Drawing Figures

METHOD AND APPARATUS FOR THE SEPARATION OF ISOTOPES

The present invention relates to a method and an apparatus for the separation of isotopes.

More particularly this invention concerns a method and an apparatus for the separation of isotopes from an atomic or molecular paramagnetic or polar beam of isotopic mixtures, by the utilization of the isotopic differences of said atoms as well as molecules, in the Electron Spin Resonance (E.S.R.) spectra and in other magnetic or electric resonances such as in the Nuclear Magnetic Resonance (N.M.R.), or Stark Resonance.

There are known in the art various methods for the separation of isotopes, such as separation by means of a mass spectrograph, by diffusion or by the more recent and advanced method of separation of isotopes by means of lasers. While the first two mentioned methods suffer from the disadvantage of requiring enormous quantities of electrical energy and hence from a high cost of production, the various laser isotope separation schemes are more suitable for enrichment of isotopes than for a complete separation of a mixture of isotopes. Furthermore the laser-controlled excitation technique is mainly adapted for isotopic mixtures in their atomic state since the individual spectral lines of molecules are not sufficiently distinguishable for the narrow laser bandwidth. When, however, said isotopes are in the atomic state, they have a very high boiling point, e.g. the boiling point of uranium is approximately 3800° C., and such a high temperature presents serious technological problems, which must be overcome.

In contradistinction to the above mentioned known methods the present invention proposes an efficient, single-stage method for the separation of isotopes from a mixture of both atoms and molecules. Thus, the working temperature of such a mixture, e.g., $UCl_4$, is only about 600° C. Another advantage is the high degree of separation which is achieved. Also, since the suggested method is suitable for the separation of most isotopes, the same apparatus can be readily used for the separation of different isotopes. Moreover, the preliminary E.S.R. research required before the use of the present method with relation to a new isotope is much less than the research required for the application of the known advanced laser methods, to a similar new isotope.

In accordance with the invention there is provided a method for the separation of isotopes comprising the steps of:

Producing a paramagnetic or polar particle beam of an isotopic mixture;

Changing the distribution of the $m_j$ values in said particle beam to form at least one beam having discrete $m_j$ value or values, where $m_j$ is the projection of the angular momentum of a particle in the direction of the applied magnetic field; or the projection of the rotational angular momentum of a polar molecule in the direction of the applied electric field;

Traversing said beam through a homogeneous magnetic or electric field while subjecting said beam to at least one field oscillating in the E.S.R. and/or N.M.R. and/or Stark resonance frequency or frequencies of at least one of the isotopes contained in said beam; and Separating the isotopes which have undergone resonance absorption or emittance from the isotopes which have not undergone resonance absorption or emittance by means of an inhomogeneous magnetic or electric field gradient.

The invention further provides an apparatus for the separation of isotopes comprising:

means for producing a paramagnetic or polar particle beam of an isotopic mixture;

means for changing the distribution of the $m_j$ values in said particle beam to at least one beam having a discrete $m_j$ value or values, where $m_j$ is the projection of the angular momentum of a particle in the direction of the applied magnetic field or the projection of the rotational angular momentum of the polar molecule in the direction of the applied electric field;

means for producing a homogeneous magnetic or electric field along a section of the path of said particle beam;

a transmitter for transmitting signals in at least one of the E.S.R. and/or N.M.R. and/or Stark resonance frequency or frequencies of at least one of the isotopes in said particle beam passing through said homogeneous magnetic or electric field; and means for producing an inhomogeneous magnetic or electric field gradient for separating said isotopes by splitting, focusing and/or diverting beams of identical isotopes.

The homogeneous and/or inhomogeneous magnetic field gradients utilized in the method and apparatus of the present invention may be produced by permanent magnets, electromagnets or superconducting magnets.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard no attempt is made to show structural details of the system in more detail than is necessary for a fundamental understanding of the invention, the description taken with the drawings making apparent to those skilled in the art how the several forms of the invention may be embodied in practice.

Figure 2:
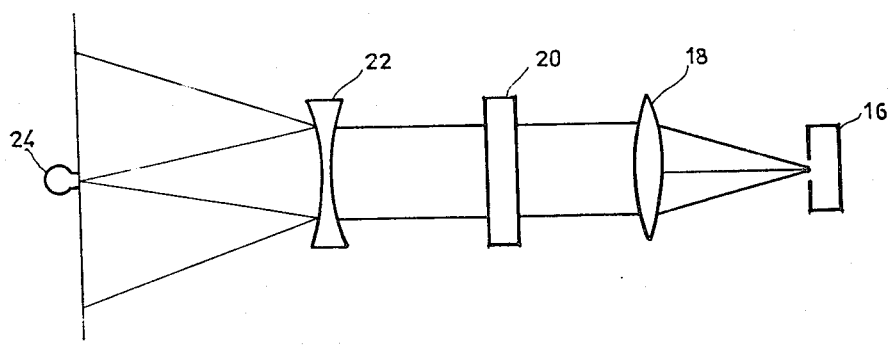

In the drawings:

FIG. 1 is a schematic illustration of an apparatus for the separation of isotopes in accordance with the invention utilizing pole pieces for producing an inhomogeneous magnetic field gradient of a similar construction to the pole pieces used in the Stern-Gerlach experiment; and FIG. 2 is a schematic illustration of a different embodiment of an apparatus for the separation of isotopes, utilizing magnetic or electric focusing lenses.

In FIG. 1 there is schematically illustrated an apparatus for the separation of isotopes comprising an oven chamber 2 adapted to produce a high intensity paramagnetic molecular beam. Preferably the high intensity beam is a collimated supersonic jet of gases produced by what is known in the art as a "nozzle beam" apparatus. Such a nozzle beam offers several advantages over the conventional effusive beam produced in an oven (an oven beam) including: (a) the axial velocity distributions for nozzle source beams are of a narrower range than that for an oven beam. This feature is of substantial significance in the present method for separation of isotopes and will be explained hereinafter; (b) the required pumping energy for an intensity unit is smaller for a nozzle beam than that of an effusive beam; (c) since the velocity distribution in the beam is more uniform than that of an effusive beam, the diversion obtained when the beam is passed through a magnetic or electric field gradient is consequently likewise more uniform; and (d) the rotational temperature of a supersonic beam is much lower in comparison with that of an effusive beam and therefore the molecular E.S.R. or Stark resonance spectra includes less resonance absorption lines.

The prime characteristic of said supersonic beam which makes it very suitable to be utilized in accordance with the present invention, is however, its relatively high intensity providing outputs several orders of magnitude greater than that of an effusive beam. For example, it is possible to form a supersonic beam of an intensity $I = 3.10^{-7}$ mol. per sec. cm$^2$, when I is measured at a distance of 1 meter from the beam's emittance aperture.

As seen in the figure, a supersonic beam 4 of a paramagnetic isotope mixtures emitted from the chamber 2 is first passed through an inhomogeneous magnetic field gradient produced by a magnetic 6. It is well known from the Stern-Gerlach experiment, that when paramagnetic particles are passed through an inhomogeneous field, said particles (atoms and molecules) become oriented in such directions that their $m_j$ values, i.e., the projection of j (the total angular momentum of a particle) in the direction of the magnetic field are provided with distinct values, e.g., the spin states of $+\frac{1}{2}\hbar$ and $-\frac{1}{2}\hbar$, or the spin states of $\alpha$ and $\beta$. Accordingly, when the beam passes through said inhomogeneous field it will split into, for example, two discrete sub-beams 4a and 4b with equal and opposite deflections from the original undeviated beam 4. The two sub-beams 4a and 4b of isotopic mixtures traverse in their continuing path a region of a homogeneous magnetic field produced by magnet 8 while being subjected in this region to a field produced by a transmitter 10 oscillating in micro and/or radio resonance frequency or frequencies of at least one of the isotopes of said sub-beams. Thus only those isotopes in the sub-beams which are capable of absorbing or emitting the energy radiated in the resonant frequency thereof will undergo spin reorientation when emerging from the homogeneous magnetic field region. It is, however, also possible to employ the known double-resonance transmission method and to transmit by means of transmitter 10, simultaneously in the E.S.R. and in the N.M.R. frequency or frequencies. Since in a supersonic beam, the velocity distribution is of a narrow range, i.e. the particles travel at a substantially uniform velocity, on the one hand there will be a uniform diversion of particles and on the other hand a high percentage of the particles excited by resonance frequency or frequencies will undergo said spin inversion, as the $\pi$ condition of the micro or the radio frequency resonance transmission is dependent on the velocity of particles in the beam. If the sub-beams 4a and 4b are then passed into a second inhomogeneous magnetic field produced by a magnet 12, they will be split into further sub-beams 4c, 4d and 4e, 4f wherein the beams will split and group in accordance with their isotopic contents. For example, if the magnet 12 will produce a field in the same direction as that of magnet 6, the isotopes in sub-beams 4a and 4b which underwent resonance absorption, will be deflected to form streams of further sub-beams 4d and 4e respectively, while the remaining isotopes in sub-beams 4a and 4b will be deflected in an equal and opposite direction to form the further sub-beams 4c and 4f.

Depending on the strength of the magnetic fields and geometrical parameters of the apparatus, it is possible to focus the further sub-beams 4d and 4e or sub-beams 4c and 4f onto a cold plate 14, where the particles will be collected therefrom by methods known in the art.

In practice and as an illustrative example only it can be shown that if (a) the magnet 6 is of a length $L_1 = 50$ cm, (b) the distance $L_2$ between the magnet 6 and the magnet 12 is 30 cm, (c) the length of magnet 12 $L_3$ is 120 cm; and (d) the collecting plate 14 is placed at a distance $L_4 = 22$ cm from the magnet 12, then for a beam source temperature $T = 800°$ K. and an average magnetic field gradient of 10 K. gauss/cm the maximum separation between the isotopes, $\Delta x$, will be 3.32 cm. Thus, for an apparatus having an overall length of approximately 225 cm, it is possible to use a beam of a diameter as measured at a distance of 225 cm from the point of emission, of approximately 3.3 cm.

While in the embodiment described in connection with FIG. 1, the particles in the beam were provided with distinct $m_j$ values by using the Stern-Gerlach method, it should be realized that a beam of particles having a Boltzmann distribution of their $m_j$ values can be transformed into a beam or several sub-beams having a discrete $m_j$ value or values by other methods and means. For example, it is possible to provide a particle beam with a substantially single $m_j$ value by means of the known optical pumping method. Once the beam has been modified to contain particles of a single $m_j$ value, the isotopes in said beam can be separated by utilizing the isotopic differences in the E.S.R. spectra of the isotopes as hereinbefore described. It is however, also possible to utilize the optical pumping system for selective isotopic irradiation by means of a laser. In order to reduce the spectral lines required by such a laser, it is proposed to combine the techniques of laser irradiation with that of E.S.R. and/or N.M.R. (Nuclear Magnetic Resonance).

The isotopes are then passed through an inhomogeneous magnetic field gradient wherein the isotopes which have undergone resonance absorption are separated from those which have not undergone resonance absorption.

With reference now to FIG. 2, there is illustrated a different embodiment of the separation of isotopes. The apparatus utilizing magnetic or electric lenses consists of a beam producing source 16, preferably a nozzle beam for producing a supersonic particle beam, a focusing magnetic or electric lens 18, a magnet or two smooth metal elements producing a homogeneous magnetic or respectively electric field, in combination with a transmitter 20 for transmitting in the resonant frequency or frequencies of selected isotope or isotopes in the beam or beams, a diverging magnetic or electric lens 22 and a collecting chamber 24.

For a paramagnetic particle beam the lens 18 may advantageously consist of a six-pole magnetic focusing lens which brings the beam to a desired parallelism with the axis and increases the flow rate of the beam, i.e. increases the beam's intensity. Consequently, the magnetic field gradients which are applied to the beam, also by lens 22, can thus be of a relatively stronger field gradient and hence the focusing of the desired isotopes can be achieved within shorter distances. In practice, therefore, the overall length of the apparatus can be shorter in comparison with similar apparatus not using said six-pole magnetic lenses.

When, however, a polar beam is considered, the lenses 18, 22 may consist of a six-pole electric focusing lens for symmetric top molecules, or of quadrupole electric focusing lens for diatomic molecules.

The method for separation of isotopes with the apparatus of FIG. 2 consisting of magnetic lenses is as follows: the particle beam and preferably the supersonic particle beam produced by the source 16, is passed through lens 18 which lens focuses for example, only the particles with a $+\frac{1}{2}\bar{h}$ $\alpha$ spin into an axial beam and directs said beam towards the magnet and transmitter 20 where the $\alpha$ spin oriented beam is irradiated in a region of a homogeneous magnetic field by a resonance frequency of resonance frequencies of at least one of the isotopes of said beam, so that the selected isotope or isotopes are transferred to a $\beta$ spin where $\beta$ is the $-\frac{1}{2}\bar{h}$ state while the remaining isotopes do not change their spin orientation. Finally, a complete separation of the isotopes is achieved by means of the magnetic lens 22, where the unchanged particles of $\alpha$ spin are focused so as to be accumulated in a collector 24 while the $\beta$ isotopes, which have undergone resonance absorption, are diverted.

Considering a supersonic beam of an intensity $I=3.10^{-7}$ mol per sec.cm$^2$, when I is measured at a distance of 1 meter, it can be shown that magnetic lenses adapted to apply a field of $2.10^4$ gauss/cm can focus a beam, having an oven temperature $T=800°$ K., to a cross-sectional area of 21.2 cm$^2$. Since, however, only the $\alpha$ spin particles are focused, the cross-sectional area of the beam is considered to be 10.6 cm$^2$. Further calculations show that with a beam intensity of $10^{-7}$ mol per sec.cm$^2$ there can be obtained from such an apparatus $10^{-6}$ mol separated isotopes per second. It is also worthwhile to mention that when atomic or molecular plane beams are used, the separated amount of isotopes can be increased to more than $10^{-3}$ mol per sec per apparatus.

Similarly to the above described method for the separation of isotopes utilizing magnetic lenses, when the particle beam consists of polar molecules, electric lenses will be used in the apparatus of FIG. 2 and the method for separation of isotopes will be as follows: the polar molecular beam and preferably the supersonic molecular beam produced by the source 16, is passed through electric lens 18 which lens focuses, for example, only the particles with $M_j=0$ and $j \geq 1$, into an axial beam and directs said beam towards the area of a homogeneous electric field and transmitter 20 where the oriented molecules are irradiated in a region of a homogeneous electric field by a Stark resonance frequency or frequencies of at least one of the isotopes of said beam, so that the selected isotope or isotopes are transferred to other $M_j$ values and change their orientation in the electric field while the remaining isotopes do not change their orientation. Substantially a complete separation of the isotopes is achieved by means of the electric lens 22, where the unchanged molecules of $M_j=0$ are focused so as to be accumulated in a collector 24 while the isotopes at other $M_j$ values which have undergone resonance absorption are diverted or focused onto a collector 24.

While particular embodiments of this invention have been described and shown it will be evident to those skilled in the art that the present invention may be embodied in other specific forms without departing from the spirit or essential characteristics thereof. The present embodiments are therefore to be considered in all respects as illustrated and not restrictive, the scope of the invention being indicated by the appended claims rather than by the foregoing description, and all changes which come within the meaning and range of equivalency of the claims are therefore intended to be embraced therein.

What is claimed is:

1. A method for the separation of isotopes comprising the steps of:

producing at least one supersonic paramagnetic or polar particle beam of an isotopic mixture;

changing the distribution of the $m_j$ values in said particle beam to form at least one beam having discrete $m_j$ value or values, where $m_j$ is the projection of the angular momentum of a particle in the direction of the applied magnetic field; or the projection of the rotational angular momentum of a polar molecule in the direction of the applied electric field;

traversing said beam through a magnetic or electric field while subjecting said beam to at least one field oscillating in the E.S.R. and/or N.M.R. and/or Stark resonance frequency or frequencies of at least one of the isotopes contained in said beam in order to cause an optimal maximum number of particles of a desired isotope to resonate as a result of the combined effect of said fields;

separating the isotopes which have undergone resonance absorption or emittance from the isotopes which have not undergone resonance absorption or emittance by means of an inhomogeneous magnetic or electric field gradient; and, collecting the separated isotopes by means of a collector.

2. A method for the separation of isotopes comprising the steps of:

producing at least one supersonic paramagnetic particle beam of an isotopic mixture;

changing the distribution of the $m_j$ values in said particle beam to form at least one beam having discrete $m_j$ value or values, where $m_j$ is the projection of the angular momentum of a particle in the direction of the applied magnetic field;

traversing said beam through a magnetic field while subjecting said beam to at least one field oscillating in the E.S.R. and/or N.M.R. frequency or frequencies of at least one of the isotopes contained in said beam in order to cause an optimal maximum number of particles of a desired isotope to resonate as a result of the combined effect of said fields;

separating the isotopes which have undergone resonance absorption or emittance from the isotopes which have not undergone resonance absorption or emittance by means of an inhomogeneous magnetic field gradient; and, collecting the separated isotopes by means of a collector.

3. A method for the separation of isotopes as claimed in claim 1 comprising the steps of:

producing a polar molecule beam of an isotopic mixture;

changing the distribution of the $m_j$ values in said particle beam to form at least one beam having discrete $m_j$ value or values, where $m_j$ is the projection of the rotational angular momentum of a polar molecule in the direction of the applied electric field;

traversing said beam through an electric field while subjecting said beam to a field oscillating in the Stark resonance frequency or frequencies of at least one of the isotopes contained in said polar beam; and separating the isotopes which have undergone resonance absorption or emittance from the isotopes which have not undergone resonance absorption or emittance by means of an inhomogeneous electric field gradient.

4. The method as claimed in claim 1 wherein said discrete $m_j$ value or values are provided by means of an inhomogeneous magnetic or electric field which is applied to said particle beam.

5. The method as claimed in claim 1 wherein said discrete $m_j$ value or values are provided by means of optical pumping.

6. The method as claimed in claim 1 wherein said discrete $m_j$ value is provided by means of a magnetic lens adapted to focus into a substantial parallel beam particles of only one discrete $m_j$ value.

7. The method as claimed in claim 3 wherein said discrete $m_j$ value is provided by means of an electric lens adapted to focus into a substantial parallel beam particles only of the low $M_j$ values.

8. The method as claimed in claim 1 wherein said discrete $m_j$ value is provided by means of a magnetic lens adapted to focus particles of positive $m_j$ values only, wherein the focal length is dependent on the $m_j$ value.

9. The method as claimed in claim 3 wherein said discrete $m_j$ value or values is provided by means of an electric lens adapted to focus particles of low $M_j$ values only wherein the focal length is dependent on the rotational quantum numbers of the molecules.

10. The method as claimed in claim 1 wherein said particle beam is a supersonic plane beam.

11. The method as claimed in claim 1 wherein said particle beam is split into at least two substantially distinct groupings of particles each having a discrete $m_j$ value.

12. The method as claimed in claim 1 wherein said magnetic field is a homogeneous magnetic field subjected to fields oscillating in the double-resonance frequencies in the E.S.R. and N.M.R. frequencies ranges.

13. The method as claimed in claim 3 wherein the beam in said electric field is subjected to fields oscillating in Stark resonance frequency or frequencies.

14. The method as claimed in claim 1 wherein said isotopes are separated by means of magnetic focusing lens.

15. The method as claimed in claim 1 wherein said inhomogeneous field is adapted to separate isotopes by splitting the beam or beams emerging from said homogeneous field into separate groups of identical isotopes, which individual groups each constitute a separate beam.

16. An apparatus for the separation of isotopes comprising:

means for producing at least one paramagnetic or polar supersonic particle plane beam of an isotopic mixture;

means for changing the distribution of the $m_j$ values in said particle beam to at least one beam having a discrete $m_j$ value or values, wherein $m_j$ is the projection of the angular momentum of a particle in the direction of the applied magnetic field or the projection of the rotational angular momentum of the polar molecule in the direction of the applied electric field;

means for producing a magnetic or electric field along a section of the path of said particle beam;

a transmitter for transmitting signals in at least one of the E.S.R. and/or N.M.R. and/or a Stark resonance frequency or frequencies of at least one of the isotopes in said particle beam passing through said magnetic or electric field in order to cause an optimal maximum number of a desired isotope to resonate as a result of the combined effect of said fields;

means for producing an inhomogeneous magnetic or electric field gradient for separating said isotopes by splitting, focusing: and/or diverting beams of identical isotopes; and, means for collecting the separated isotopes.

17. An apparatus for the separation of isotopes comprising:

means for producing at least one paramagnetic supersonic particle plane beam of an isotopic mixture;

means for changing the distribution of the $m_j$ values in said particle beam to at least one beam having a discrete $m_j$ value or values, where $m_j$ is the projection of the angular momentum of a particle in the direction of the applied magnetic field;

means for producing a magnetic field along a section of the path of said particle beam;

a transmitter for transmitting signals in at least one of the E.S.R. and/or N.M.R. frequency or frequencies of at least one of the isotopes in said particle beam passing through said magnetic field in order to cause an optimal maximum number of a desired isotope to resonate as a result of the combined effect of said fields;

means for producing an inhomogeneous magnetic field gradient for separating said isotopes by splitting, focusing and/or diverting beams of identical isotopes; and, means for collecting the separated isotopes.

18. An apparatus for the separation of isotopes comprising:

means for producing at least one polar supersonic molecule plane beam of an isotopic mixture;

means for changing the distribution of the $m_j$ value in said particle beam to at least one beam having a discrete $m_j$ value or values where $m_j$ is the projection of the rotational angular momentum of a polar molecule in the direction of the applied electric field;

means for producing a electric field along a section of the path of said particle beam;

a transmitter for transmitting signals in a field oscillating in a Stark resonance frequency or freqencies of at least one of the isotopes in said polar beam passing through said electric field in order to cause an optimal maximum number of a desired isotope to resonate as a result of the combined effect of said fields;

means for producing an inhomogeneous electric field gradient for separating said isotopes by splitting, focusing and/or diverting beams of identical isotopes; and, means for collecting the separated isotopes.

19. The apparatus as claimed in claim 16 wherein said means for changing the distribution of the $m_j$ values in said particle beam is a magnet adapted to apply an inhomogeneous magnetic field gradient to said beam.

20. The apparatus as claimed in claim 16 wherein said means for changing to $m_j$ value or values in the particles in the beam is an optical radiating device.

21. The apparatus as claimed in claim 16 wherein said means for changing the distribution of the $m_j$ value or values in said beam is a focusing magnetic lens.

22. The apparatus as claimed in claim 18 wherein said means for changing the distribution of the $m_j$ value or values in said beam is a focusing electric lens.

23. The apparatus as claimed in claim 16 wherein said means for separating between said isotopes is a magnetic lens.

24. The apparatus as claimed in claim 18 wherein said means for separating between said isotopes is an electric lens.

25. The apparatus as claimed in claim 16 wherein said isotopes are separated by means of beam splitting inhomogeneous field gradients.

26. The apparatus as claimed in claim 16, wherein said means for collecting the separated isotopes is a cold plate.

* * * * *

UNITED STATES PATENT AND TRADEMARK OFFICE
CERTIFICATE OF CORRECTION

PATENT NO. : 4,199,679
DATED : April 22, 1980
INVENTOR(S) : Aviv Ami-Rav

It is certified that error appears in the above—identified patent and that said Letters Patent is hereby corrected as shown below:

Column 3, Line 20    "magnetic" should be --magnet--

Claim 16, Line 65    "wherein" should be --where--

Signed and Sealed this

Twenty-eighth Day of October 1980

[SEAL]

Attest:

SIDNEY A. DIAMOND

Attesting Officer

Commissioner of Patents and Trademarks